(12) United States Patent
Walmsley

(10) Patent No.: US 6,429,806 B1
(45) Date of Patent: Aug. 6, 2002

(54) COMPLEX HOMODYNED FSK DIPLEX RADAR

(75) Inventor: Prescott A. Walmsley, Temecula, CA (US)

(73) Assignee: Eaton-Vorad Technologies, L.L.C., San Diego, CA (US)

( * ) Notice: Subject to any disclaimer, the term of this patent is extended or adjusted under 35 U.S.C. 154(b) by 0 days.

(21) Appl. No.: 09/785,843

(22) Filed: Feb. 16, 2001

(51) Int. Cl.[7] ............................................. G01S 13/28
(52) U.S. Cl. ...................... 342/127; 342/118; 342/145; 342/70
(58) Field of Search ............................ 342/70, 118, 128, 342/127, 108, 145, 189; 367/99, 100, 101, 124, 125, 128

(56) References Cited

U.S. PATENT DOCUMENTS 6,236,352 B1 * 5/2001 Walmsley .................... 342/118

FOREIGN PATENT DOCUMENTS

JP  141811 A * 5/2001

OTHER PUBLICATIONS

Mondal et al., "77 GHz MMIC T/R Module for Diplex Radar Application in Collision Avoidance Radar (CAR)", Gallium Arsenid Integrated Circuit (GaAs IC) Symposium, Technical Digest 1998., 20th Annual., pp. 181–184.*
Skolnik, Merrill I., "Introduction to Radar Systems", 2nd Edition, McGraw–Hill, 1980, pp. 119–123.
Skolnik, Merrill I., "Radar Handbook", 2nd Edition, McGraw–Hill, 1990, pp. 3.32–3.35.

* cited by examiner

Primary Examiner—Ian J. Lobo
(74) Attorney, Agent, or Firm—Merle W. Richman, III, Ewq.; Martin J. Jaquez, Esq.; Jaquez & Associates

(57) ABSTRACT

A complex frequency shift keyed homodyned diplexed radar system and method that can accurately determine the range of one or more targets where the targets have little or no velocity relative to the radar system. The system and method generates a FSK electromagnetic wave that is reflected off the one or more targets and converted into a delayed or phase shifted baseband signal and undelayed baseband signal where the delayed and an undelayed baseband signal may be analyzed to determine the range of the one or more targets.

18 Claims, 2 Drawing Sheets

COMPLEX HOMODYNED FSK DIPLEX RADAR

BACKGROUND OF THE INVENTION

1. Field of the Invention

This invention relates to radar systems (and sonar and ladar) and methods for determining the range of objects, and more particularly to radar systems and methods for accurately determining the range of objects having little or no relative velocity.

2. Description of Related Art

Radio Detection and Ranging ("Radar") is commonly employed to detect and determine the range of objects or targets relative to the radar system. FIG. 1 is a diagram of a general radar system 1 and a channel or medium 2 that includes a target 30. As shown in FIG. 1, the radar system includes a transmitter 10 having a transmit antenna 12 and a receiver 20 having a receive antenna 22. In simple terms, the transmitter 10 generates a signal s(t) that is converted to an electromagnetic wave 14 by the transmit antenna 12. The signal travels at the speed of light, c away from the transmit antenna 12 in the medium of the channel 2. The signal may reflect off targets or objects such as the target 30 in the channel 2. The receive antenna 22 receives the reflected electromagnetic waves and generates a signal Sr(t), which is processed by the receiver 20. It is noted that the transmit antenna 12 and the receive antenna 22 may be in close proximity (monostatic radar systems). Alternatively, the transmitter 10 and the receiver 20 may be separated by a large distance (e.g., in bistatic radar systems).

In radar systems, if s(t) is a pulsed signal, the received signal $s_r(t)$ is nominally equal to $\alpha s(t-t_r)$. In such systems, $t_r$ is the round trip delay or the time required for the electromagnetic wave to travel from the radar transmit antenna to the target and back to the receive antenna and $\alpha$ is an amplitude scaling coefficient. In such systems the range of the target is nominally equal to $c \times t_r/2$ where c is the speed of light (approximately equal to $3(10^8)$m/s in a vacuum). If the target is moving away from or toward the radar system (i.e., has a non-zero relative velocity), the relative velocity of the target may be determined by calculating the frequency or Doppler shift of s(t). In particular, it is well known that the velocity of the target, v, is nominally equal to $-f_d*c/f_0$ where $f_d$ is the Doppler frequency and $f_0$ is the frequency of the transmitted wave 14 of s(t). These principles also apply to sonar and ladar (laser-based) target detection and ranging systems. In ladar the velocity of propagation is also the speed of light (the same as for radar). In sonar the velocity of propagation is the speed of sound (which varies with the nature of the medium in the channel). Various radar systems and methods are developed to exploit these well-known attributes to measure the range or velocity of targets in different environments. For example, a prior art system 100 that is used to measure the range and velocity of objects is shown in FIG. 2. As is described below in more detail, the radar system 100 is a homodyned frequency shift keyed ("FSK") diplex radar system. As shown in FIG. 2, the system 100 includes a signal generator or oscillator 101, a transmit antenna 102, a transmit coupler 103, a receive antenna 106, a mixer 104, a switch 108, a dual anti-alias filter 105, and a signal processor 107. The signal generator 101 alternately generates two transmit signals: $s_1(t)=\text{Cos}((\omega_0+\omega_1)t-\theta_0)$ and $s_2(t)=\text{Cos}((\omega_0-\omega_1)t-\theta_0)$. The signal generator 101 is thus a diplexed signal generator that alternates between the generation of the $s_1(t)$ and $s_2(t)$ signals. The transmit signals $s_1(t)$ and $s_2(t)$ are transmitted by the transmit antenna 102 via the transmit coupler 103. The receive antenna 106 receives the reflected signals $s_r(t)$ from target objects where the signals are in the form of $s(t-\tau)$ (switching between $s_1(t-\tau)$ and $s_2(t-\tau)$). Accordingly, $s_r(t)$ is equal to either:

$$\text{Cos}((\omega_0+\omega_1)(t-\tau)-\theta_0)$$

or $$\text{Cos}((\omega_0-\omega_1)(t-\tau)-\theta_0).$$

The received signal $s_r(t)$ and the transmit signals $s_1(t)$ and $s_2(t)$ are downconverted (mixed and low-pass-filtered) by the mixer 104 with the "local oscillator" ("LO") signal $\text{Cos}((\omega_0+\omega_1)t)$ and $\text{Cos}((\omega_0-\omega_1)t)$. The variable $\theta_0$ represents the phase delay of the signal between the transmit antenna 102 and the mixer 104 LO signal. The resultant signal is the low pass filter ("LPF") Of $s_r(t) \times s_1(t)$ or $s_2(t)$, which is either:

$$LPF\{\text{Cos}((\omega_0+\omega_1)t)\text{Cos}((\omega_0+\omega_1)(t-\tau)-\theta_0)\}=\text{Cos}((\omega_0+\omega_1)\tau+\theta_0) \qquad \text{Eq. 1}$$

$$LPF\{\text{Cos}((\omega_0-\omega_1)t)\text{Cos}((\omega_0-\omega_1)(t-\tau)-\theta_0)\}=\text{Cos}((\omega_0-\omega_1)\tau+\theta_0). \qquad \text{Eq. 2}$$

The switch 108 is synchronized to the changes in frequency at the diplexed transmit signal generator 101 and thus generates two different outputs at ports 110 and 112 having signals, F1 and F2 nominally equal to Eq. 1 and Eq. 2 after anti-alias filtering by the dual anti-alias filter 105.

In the above equations, "$\tau$" is the round trip propagation delay to the target. By substituting $\tau=(2/c)(R+Vt)$ and by letting $\omega_d=\omega_0(2V/c)$ (note that the Doppler frequency is $f_d=2Vf_0/c$), $\theta_0'=\omega_0(2R/c)+\theta_0$, $\omega_1'=\omega_1(1-(2V/c))\approx\omega_1$, then $\omega_0\tau+\theta_0=\omega_0(2V/c)t+\omega_0(2R/c)+\theta_0=\omega_d t+\theta_0'$ and $\omega_1\tau+\theta_1=\omega_1(2V/c)t+\omega_1(2R/c)+\theta_1=\omega_1(2Vc)t+\theta_1+2\omega_1R/c=\theta_1+2\omega_1R/c$. Therefore the equations that were written in terms of $\tau$ can also be written as:

$$F2=\text{Cos}(\omega_d t+\theta_0'+2\omega_1R/c))$$

and $$F1=\text{Cos}(\omega_d t+\theta_0'-2\omega_1R/c)).$$

Thus, the F1 and F2 signals of the radar system 100 have the same amplitude and frequency but have a different phase. The phase difference between the F1 and F2 signals is $\Delta\phi=2\omega_1\tau=2(2\omega_1R/c)=(4\pi(2f_1)R/c)$. Accordingly for this system 100, the range R is computed by the signal processor 107 as follows: $R=(\Delta\phi)c/(4\pi(\Delta f))$ where $\Delta f=2f_1$ is commonly called the "deviation frequency". Targets of the prior art system (real FSK diplex Doppler radar) appear as signals of the form $\text{Cos}(\omega_d t+\theta_0'-2\omega_1R/c))=\text{Cos}(\omega_0(2V/c)t+\theta_0'-2\omega_1R/c))$.

For outbound targets, i.e., targets with increasing range with time, the Doppler shift $f_d$ is negative. For inbound targets, i.e., targets with decreasing range with time, the Doppler shift $f_d$ is positive. The FFT spectrum for real receivers, however, is always symmetrical about its origin. Specifically, the negative frequency portion of the spectrum is equal to the complex conjugate of the positive frequency portion of the spectrum. It is because of this symmetry that target Doppler signals appearing in any Doppler bin may either be inbound targets or outbound targets, thus there exists a velocity direction ambiguity.

Since the two halves of the spectrum in real receivers contain essentially the same information it is customary in real receivers to only process target information in only one half of the spectrum, e.g., in the positive frequency portion of the spectrum. In the prior art system 101 the direction ambiguity is resolved by observing the polarity of the measured delta phase. Since it is known that target ranges must always be positive it can be inferred whether the target information corresponds to an inbound or outbound target. It must be pointed out that resolving this ambiguity does not resolve inbound and outbound targets in the sense of having independent measurements. It is a weakness of the prior art system that the information for two targets with the same Doppler frequency, e.g., one inbound at $+f_d$ and one outbound at $-f_d$, will have their information appearing in the same FFT Doppler bin, resulting in a single corrupted measurement. The resulting measurement cannot be independent for each target since there is only one measurement. If it were possible for the Doppler information for each target to appear in separate FFT Doppler bins then the two targets would actually be resolved in the sense of having independent measurements for each target.

Radars may be utilized in many different applications. In some applications, it may desirable to be able to determine the range of a target that has zero relative velocity. Such a system may be desirable when used in conjunction with a cruise control system in a vehicle or a side-facing radar to detect vehicles in adjacent lanes. Given the equations provided above, it is apparent that the prior radar system 100 is unable to determine the range of a target having zero relative velocity since the phase of the DC Doppler return voltage cannot be measured. In some applications for the radar system 100 this limitation may be undesirable or unacceptable.

In addition to being unable to determine the range of a target having zero relative velocity, the prior art system 100 also has difficulty determining the range of "fading targets". A target appears as a fading target to a radar system when the radar signal reflected by the target has multiple reflections off the target such as from different points along the surface of a target. The numerous reflections of the signal that are reflected by the target generate constructive and destructive interference. In particular, the reception of multiple signals reflected from a single target can distort the phase of the received signal. In the prior art system 100 shown in FIG. 2, such a distortion of the phase also distorts or limits the accuracy of range determinations.

Finally, the prior art system 100 of FIG. 2 may not be able to resolve range ambiguities. Target range is calculated by a phase measurement. All phase measurements are ambiguous in multiples of 360°. Therefore, it is possible for the prior art system 100 to detect a target and calculate its range with a large range ambiguity. Consequently, a need exists for a radar system that can accurately determine the range of targets with little ambiguity.

SUMMARY OF THE INVENTION

The present invention includes a complex frequency shift keyed homodyned diplexed radar system and method that can accurately determine the range of one or more targets where the targets have little or no velocity relative to the radar system. The system and method generates a FSK electromagnetic wave that is reflected off the one or more targets and converted into a delayed or phase shifted baseband signal and an undelayed baseband signal where the delayed and undelayed baseband signal may be analyzed to determine the range of one or more targets.

In one embodiment, the radar system includes an RF signal generator, a first mixer, a delay circuit and a second mixer. The RF signal generator generates a frequency shifted keyed (FSK) RF signal that is converted to an electromagnetic signal and projected towards one or more targets. The first mixer is coupled to the RF signal generator and mixes a received signal (that is reflected off the one or more targets) and the FSK RF signal to generate a real baseband FSK signal. The delay circuit is coupled to the RF signal generator and delays or phase shifts the FSK RF signal. The second mixer is coupled to the delay circuit and mixes the received signal and the delayed FSK RF signal to generate an imaginary baseband FSK signal. The real baseband FSK signal and the imaginary baseband FSK signal can be used to determine the range of one or more targets where the targets have little or no velocity relative to the radar system.

The radar system may also include a transmit antenna coupled to the RF signal generator where the transmit antenna converts the FSK RF signal to an electromagnetic wave to be directed towards the one or more targets. The radar system may further include a receive antenna coupled to the first mixer and the second mixer. The receive antenna receives electromagnetic waves reflected off the one or more targets and convert the waves to the received signal. The radar system may further include a first switch coupled to the first mixer. The first switch converts the real FSK signal into a first frequency real signal and a second frequency real signal. The system may also include a second switch coupled to the second mixer. The second switch converts the imaginary FSK signal into a first frequency imaginary signal and a second frequency imaginary signal. It is noted that the delay circuit is ideally a phase shifter that phase shifts the FSK RF signal by 90 degrees.

The present invention also includes a method of determining the range of one or more targets having no relative velocity. The method includes generating a frequency shifted keyed (FSK) RF signal and converting the FSK RF signal into an electromagnetic wave directed toward the one or more targets. The method also receives electromagnetic waves reflected from the one or more targets and converts the electromagnetic waves into a received signal. The method mixes the received signal and the FSK RF signal to generate a real baseband FSK signal. The method delays the FSK RF signal and mixes the received signal and the delayed FSK RF signal to generate an imaginary baseband FSK signal. Finally, the method analyzes the real baseband FSK signal and the imaginary baseband FSK signal to determine the range of the one or more targets.

The method may further convert the real FSK signal into a first frequency real signal and a second frequency real signal and convert the imaginary FSK signal into a first frequency imaginary signal and a second frequency imaginary signal. This method then analyzes the first frequency real signal, the second frequency real signal, the first frequency imaginary signal, and the second frequency imaginary signal to determine the range of the one or more targets. As in the system above, the method ideally shifts the phase of the FSK RF signal by 90 degrees.

BRIEF DESCRIPTION OF THE DRAWINGS

The objects, advantages, and features of this invention will become readily apparent in view of the following description, when read in conjunction with the accompanying Figures, in which.

Like reference numbers and designations in the various drawings refer to like elements.

DETAILED DESCRIPTION OF THE INVENTION

Throughout this description, the preferred embodiment and examples shown should be considered as exemplars, rather than limitations on the present invention.

Figure 1:
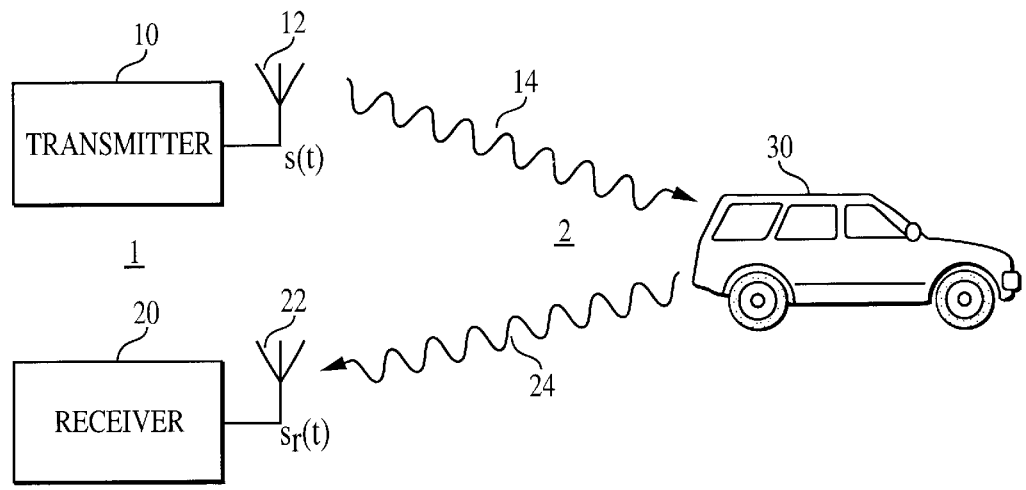
FIG. 1 is a diagram of an application of a basic radar system in a channel.
Figure 2:
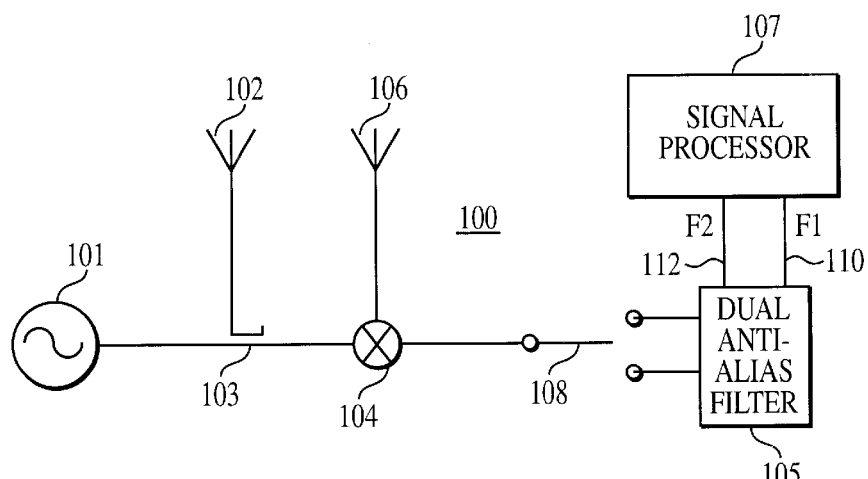
FIG. 2 is a block diagram of a prior art homodyned frequency shift keyed diplexed radar system.
Figure 3:
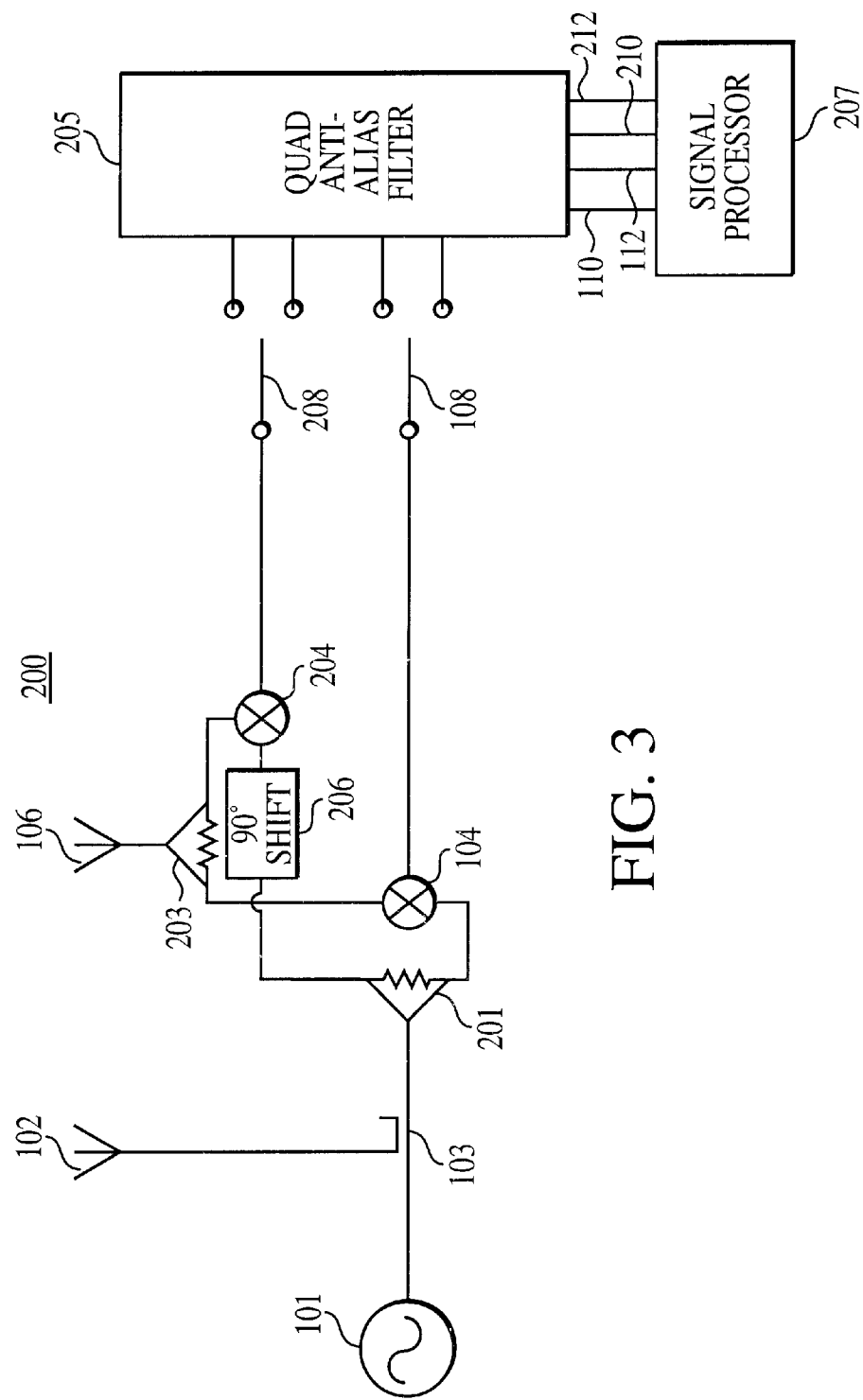
FIG. 3 is a block diagram of a complex homodyned frequency shift keyed diplexed radar system in accordance with the present invention.

FIG. 3 is a block diagram of an exemplary radar system 200 according to the present invention. The system 200 is a complex homodyned FSK diplexed radar system. As shown in FIG. 3, the system 200 includes a signal generator or oscillator 101, a transmit antenna 102, a transmit coupler 103, a receive antenna 106, a first mixer 104, a second mixer 204, a first switch 108, a second switch 208, a delay circuit 206, a quad anti-alias filter 205, and a signal processor 207. The signal generator 101 alternately generates two transmit signals: $s_1(t)=\text{Cos}((\omega_0+\omega_1)t-\theta_0)$ and $s_2(t)=\text{Cos}((\omega_0-\omega_1)t-\theta_0)$. The signal generator 101 is thus a diplexed signal generator that alternates between the generation of the $s_1(t)$ and $s_2(t)$ signals. The transmit signals $s_1(t)$ and $s_2(t)$ are transmitted by the transmit antenna 102 via the transmit coupler 103. The receive antenna 106 receives the reflected signals $s_r(t)$ from target objects where the signals are in the form of $s(t-\tau)$ (switching between $s_1(t-\tau)$ and $s_2(t-\tau)$). Accordingly, $s_r(t)$ is equal to either:

$$\text{Cos}((\omega_0+\omega_1)(t-\tau)-\theta_0)$$

or $$\text{Cos}((\omega_0-\omega_1)(t-\tau)-\theta_0).$$

The received signal $s_r(t)$ is downconverted (mixed and low-pass-filtered) by the mixer 104 with the "local oscillator" ("LO") signal $\text{Cos}((\omega_0+\omega_1)t)$ and $\text{Cos}((\omega_0-\omega_1)t)$ ($s_1(t)$ and $s_2(t)$). The variable $\theta$ represents the phase delay of the signal between the transmit antenna 102 and the mixer 104 LO signal. The resultant signal is the low pass filter ("LPF") of $s_r(t) \times s_1(t)$ or $s_2(t)$, which is either:

$$LPF\{\text{Cos}((\omega_0+\omega_1)t)\text{Cos}((\omega_0+\omega_1)(t-\tau)-\theta_0)\}=\text{Cos}((\omega_0+\omega_1)\tau+\theta_0)=F2_{real} \quad \text{Eq. 3}$$

$$LPF\{\text{Cos}((\omega_0-\omega_1)t)\text{Cos}((\omega_0-\omega_1)(t-\tau)-\theta_0)\}=\text{Cos}((\omega_0-\omega_1)\tau+\theta_0)=F1_{real} \quad \text{Eq. 4}$$

The switch 108 is synchronized to the changes in frequency at the diplexed transmit signal generator 101 and thus generates two different outputs at ports 110 and 112 having signals, $F1_{real}$ and $F2_{real}$ as shown in Eq. 4 and Eq. 3 after anti-alias filtering by the dual anti-alias filter 205.

In addition, the local oscillator signals ($s_1(t)$ and $s_2(t)$) are phase shifted by 90 degrees by the delay circuit 206. It is noted that different configurations are possible to phase shift the signals by 90 degrees. For example, the delay circuit 206 may be placed before the mixer 104. In addition, a 45-degree phase shifter or delay circuit may be placed before the mixer 104 and the mixer 204. The received signal $s_r(t)$ is downconverted (mixed and low-pass-filtered) by the second mixer 204 with the phase shifted local oscillator signals $\text{Sin}((\omega_0+\omega_1)t)$ and $\text{Sin}((\omega_0-\omega_1)t)$. The resultant signal is the low pass filter ("LPF") of $s_r(t) \times s_1(t+90°)$ or $s_2(t+90°)$, which is either:

$$LPF\{\text{Sin}((\omega_0-\omega_1)t)\text{Cos}((\omega_0+\omega_1)(t-\tau)-\theta_0)\}=\text{Sin}((\omega_0+\omega_1)\tau+\theta_0)=F2_{imag} \quad \text{Eq. 5}$$

$$LPF\{\text{Sin}((\omega_0-\omega_1)t)\text{Cos}((\omega_0-\omega_1)(t-\tau)-\theta_1)\}=\text{Sin}((\omega_0-\omega_1)\tau+\theta_0)=F1_{imag} \quad \text{Eq. 6}$$

The second switch 208 is also synchronized to the changes in frequency at the diplexed transmit signal generator 101 and thus generates two different outputs at ports 210 and 212 having signals, $F1_{imag}$ and $F2_{imag}$ nominally equal to Eq. 6 and Eq. 5 after anti-alias filtering by the dual anti-alias filter 205.

In the above equations, "$\tau$" is the round trip propagation delay to the target. By substituting $\tau=(2/c)(R+Vt)$ and by letting $(\omega_d=\omega_0(2V/c))$ (note that the Doppler frequency is $f_d=2Vf_0/c$), $\theta_0'=\omega_0(2R/c)+\theta_0$, $\omega_1'=\omega_1(1-(2V/c))\approx\omega_1$, then $\omega_0\tau+\theta_0=\omega_0(2V/c)t+\omega_0(2R/c)+\theta_0=\omega_d t+\theta_0'$ and $\omega_1\tau+\theta_1=\omega_1(2V/c)t+\omega_1(2R/c)+\theta_1=\omega_1(2V/c)t+\theta_1+2\omega_1R/c=\theta_1+2\omega_1R/c$. Therefore the equations that were written in terms of $\tau$ can also be written as:

$$F2_{real}=\text{COS}(\omega_d t+\theta_0'+2\omega_1R/c));$$

$$F1_{real}=\text{COS}(\omega_d t+\theta_0'-2\omega_1R/c));$$

$$F2_{imag}=\text{Sin}(\omega_d t+\theta_0'+2\omega_1R/c));$$

and $$F1_{imag}=\text{Sin}(\omega_d t+\theta_0'-2\omega_1R/c)).$$

Thus, the F1 and F2 signals of the radar system 200 have the same amplitude and frequency but have a different phase. The phase difference between the F1 and F2 signals is $\Delta\phi=2\omega_1\tau=2(2\omega_1R/c)=(4\pi(2f_1)R/c)$. Accordingly for this system 200, the range R is computed by the signal processor 207 as follows: $R=(\Delta\phi)c/(4\Delta(\Delta f))$ where $\Delta f=2f_1$ is commonly called the "deviation frequency". Targets of the system 200 may appear as signals of the form $\text{Cos}((\omega_d t+\theta_0-2\omega_1R/c))=\text{Cos}(\omega_0(2V/c)t+\theta_0'-2\omega_1R/c))$.

By generating both an undelayed and a delayed signal from mixers 104 and 204, the radar system 200, the signal processor 207 can determine whether a target has a positive relative velocity or a negative relative velocity. In particular, due to the phase reference in the signals, the upper sideband can be distinguished from the lower sideband. Further, the present invention can accurately determine the range of targets that have a Doppler shift about zero, i.e., that have little or no velocity relative to the radar system 200.

It is an advantage of the radar system 200 that is can resolve the velocity direction ambiguity of the prior art system. The information for two targets of opposite directions and the same magnitude of Doppler frequency, e.g., one inbound at $+f_d$ and one outbound at $-f_d$ will have their information appearing in separate FFT Doppler bins. This is possible because in a complex receiver the time domain signals have the form:

$$\text{Exp}(j(\omega_d t+\theta_0'-2\omega_1R/c))=\text{Exp}(j(\omega_0(2V/c)t+\theta_0'-2\omega_1R/c))$$

where j equals the square root of minus one. As is well known to one of ordinary skill in the art, the information of targets with $-f_d$ Doppler frequency appear in the $-f_d$ FFT Doppler bin independently of the information of targets with $+f_d$ Doppler frequency, which appear in the $+f_d$ FFT Doppler bin. All that is needed here is to show how target signals received by the complex radar system 200 can be expressed as a complex rotating phasor time domain signal as given by the above equation. By using Euler's identity the complex rotating phasor time domain signal can be expressed as $\text{Exp } jX)=\text{Cos}(X)+j\text{Sin}(X)$ where $$X=(\omega_0-\omega_1)\tau+\theta_0=(\omega_d\tau+\theta_0'-2\omega_0R/c=\omega_0(2V/c)t+\theta_0'-2\omega_1R/c.$$

This condition is satisfied when we form the following lower sideband signals for $\text{Expo}(j(\omega_0-\omega_1)\tau+\theta_0)$: $\cos(X)=F1_{real}+F2_{imag}$ and $\sin(X)=F2_{real}-F1_{imag}$. Alternatively, we could form the following upper sideband signals for $\text{Expo}(j((\omega_0+\omega_1)\tau+\theta_0))$: $\cos(X)=F1_{real}-F2_{imag}$ and $\sin(X)=F2_{real}+F1_{imag}$.

Notice that all four of the necessary signals, $F1_{real}$, $F1_{imag}$, $F2_{real}$, and $F2_{imag}$ are formed by the complex FSB diplex Doppler radar system 200. Thus the complex form of the present invention can both determine the direction of targets and resolve inbound and outbound targets with the same Doppler frequency, unlike the prior art system. Another benefit of such complex signal processing is that there are twice as many FFT Doppler bins (target resolution cells) with independent target information, for a given FFT length, than with a real receiver. This helps resolve targets that would otherwise collapse into the same FFT bin, improving target resolution and target detectability in applications with low target velocities (such as in cruise control or side facing radar) or applications with lots of target fluctuations (such as in detecting people walking).

One of skill in the art will appreciate that modifications may be made to these embodiments without departing from the spirit and scope of the invention. Accordingly, it is to be understood that the invention is not to be limited by the specific illustrated embodiments, but only by the scope of the appended claims.

What is claimed is:

1. A radar system for determining the range of targets, the system comprising:

(a) an RF signal generator, the generator generating a frequency shifted keyed (FSK) RF signal;

(b) a first mixer coupled to the RF signal generator, the first mixer mixing a received signal and the FSK RF signal to generate a real baseband FSK signal;

(c) a delay circuit coupled to the RF signal generator, the delay circuit delaying the FSK RF signal; and (d) a second mixer coupled to the delay circuit, the second mixer mixing the received signal and the delayed FSK RF signal to generate an imaginary baseband FSK signal, (e) wherein the real baseband FSK signal and the imaginary baseband FSK signal can be used to determine the range of targets having little or no velocity relative to the radar system.

2. The radar system according to claim 1, further comprising a transmit antenna coupled to the RF signal generator, the transmit antenna converting the FSK RF signal to an electromagnetic wave directed toward to the targets.

3. The radar system according to claim 2, further comprising a receive antenna coupled to the first mixer and the second mixer, the receive antenna receiving electromagnetic waves reflected off the targets and converting them to the receive signal.

4. The radar system according to claim 1, further comprising:

a) a first switch coupled to the first mixer, the first switch converting the real FSK signal into a first frequency real signal and a second frequency real signal; and b) a second switch coupled to the second mixer, the second switch converting the imaginary FSK signal into a first frequency imaginary signal and a second frequency imaginary signal.

5. The radar system according to claim 4, wherein the delay circuit is a phase shifter and the phase shifter shifts the phase of the FSK RF signal by 90 degrees.

6. The radar system according to claim 5, further comprising a transmit antenna coupled to the RF signal generator, the transmit antenna converting the FSK RF signal to an electromagnetic wave directed toward the targets.

7. The radar system according to claim 6, further comprising a receive antenna coupled to the first mixer and the second mixer, the receive antenna receiving electromagnetic waves reflected off the targets and converting them to the receive signal.

8. A method of determining the range of one or more targets having little or no velocity relative to device employing the method, the method comprising the steps of:

a) generating a frequency shifted keyed (FSK) RF signal;

b) converting the FSK RF signal into electromagnetic waves directed toward the one or more targets;

c) receiving electromagnetic waves reflected from the one or more targets and converting the electromagnetic waves into a received signal;

d) mixing the received signal and the FSK RF signal to generate a real baseband FSK signal;

e) delaying the FSK RF signal;

f) mixing the received signal and the delayed FSK RF signal to generate an imaginary baseband FSK signal; and (f) analyzing the real baseband FSK signal and the imaginary baseband FSK signal to determine the range of the one or more targets.

9. The method according to claim 8, further comprising the steps of:

a) converting the real FSK signal into a first frequency real signal and a second frequency real signal;

b) converting the imaginary FSK signal into a first frequency imaginary signal and a second frequency imaginary signal; and c) analyzing the first frequency real signal, the second frequency real signal, the first frequency imaginary signal, and the second frequency imaginary signal to determine the range of the one or more targets.

10. The method of claim 8, wherein the step of delaying the FSK RF signal includes the step of shifting the phase of the FSK RF signal by 90 degrees.

11. The method of claim 9, wherein the step of delaying the FSK RF signal includes the step of shifting the phase of the FSK RF signal by 90 degrees.

12. A radar system for determining the range of one or more targets having little or no velocity relative to the radar system, the system comprising:

a) means for generating a frequency shifted keyed (FSK) RF signal;

b) means for mixing a received signal and the FSK RF signal to generate a real baseband FSK signal, the received signal generated from a form of the FSK RF signal reflected off the one or more targets;

c) means for delaying the FSK RF signal;

d) means for mixing the received signal and the delayed FSK RF signal to generate an imaginary baseband FSK signal; and e) means for analyzing the real baseband FSK signal and the imaginary baseband FSK signal to determine the range of the one or more targets.

13. The radar system of claim 12, further comprising means for converting the FSK RF signal into an electromagnetic wave directed toward the one or more targets.

14. The radar system of claim 12, further comprising means for receiving electromagnetic waves reflected from the one or more targets and converting the electromagnetic waves into the received signal.

15. The radar system of claim 13, further comprising means for receiving electromagnetic waves reflected from the one or more targets and converting the electromagnetic waves into the receive signal.

16. The radar system according to claim 12, further comprising:
   a) means for converting the real FSK signal into a first frequency real signal and a second frequency real signal;
   b) means for converting the imaginary FSK signal into a first frequency imaginary signal and a second frequency imaginary signal; and
   c) means for analyzing the first frequency real signal, the second frequency real signal, the first frequency imaginary signal, and the second frequency imaginary signal to determine the range of the one or more targets.

17. The radar system of claim 12, wherein the means for delaying the FSK RF signal includes means for shifting the phase of the FSK RF signal by 90 degrees.

18. The radar system of claim 13, wherein the means for delaying the FSK RF signal includes means for shifting the phase of the FSK RF signal by 90 degrees.

* * * * *